United States Patent [19]

Champlin

[11] Patent Number: 5,419,568
[45] Date of Patent: May 30, 1995

[54] METHOD AND APPARATUS FOR REDUCING PACKING RING SPIN FOR TRAPEZOIDALLY SHAPED MECHANICALLY BRAIDED PACKING

[75] Inventor: George B. Champlin, Stoneham, Mass.

[73] Assignee: Seal Company of New England, Inc., Manchester, N.H.

[21] Appl. No.: 973,049

[22] Filed: Nov. 6, 1992

[51] Int. Cl.$^6$ ............................................. F16J 15/32
[52] U.S. Cl. ..................................... 277/123; 277/105; 277/230
[58] Field of Search ................ 277/1, 105, 116.8, 119, 277/123, 125, 193, 196, 230; 87/5, 7, 8, 11, 13

[56] References Cited

U.S. PATENT DOCUMENTS

| | | | |
|---|---|---|---|
| 3,472,522 | 10/1969 | Winfrey | 277/165 |
| 3,646,846 | 3/1972 | Houghton | 87/1 |
| 3,663,024 | 5/1972 | Traub | 277/165 |
| 4,550,639 | 11/1985 | Champlin | 87/7 |
| 4,672,829 | 6/1987 | Gater et al. | 70/472 |
| 4,672,879 | 6/1987 | Champlin | 87/5 |
| 4,729,277 | 3/1988 | Champlin | 87/5 |
| 4,802,389 | 2/1989 | Shultz | 81/127 |

Primary Examiner—Daniel G. DePumpo
Attorney, Agent, or Firm—Robert K. Tendler

[57] ABSTRACT

A system for reducing packing ring spin and opening up of the joints formed by the ends of a packing ring during break-in of trapezoidally-shaped mechanical braided packing involves utilization of additional warp yarns within the sides of the packing. These additional warp yarns bulge the packing at the sides of the packing above its horizontal centerline such that the outer portion of the packing is provided with a solid rectangular cross section. The solid section increases frictional contact between the rings and the stuffing box and between the rings themselves to eliminate packing ring spin. When the packing is wrapped around a shaft the bulging sides become flat for secure elongated anti-spin contact both between the packing rings and between the end ring and the bottom of the stuffing box. The utilization of the anti-spin configuration eliminates packing ring spin and the opening up of the joints formed by the ends of the packing rings during break-in, regardless of operator error in the installation of the packing rings.

6 Claims, 5 Drawing Sheets

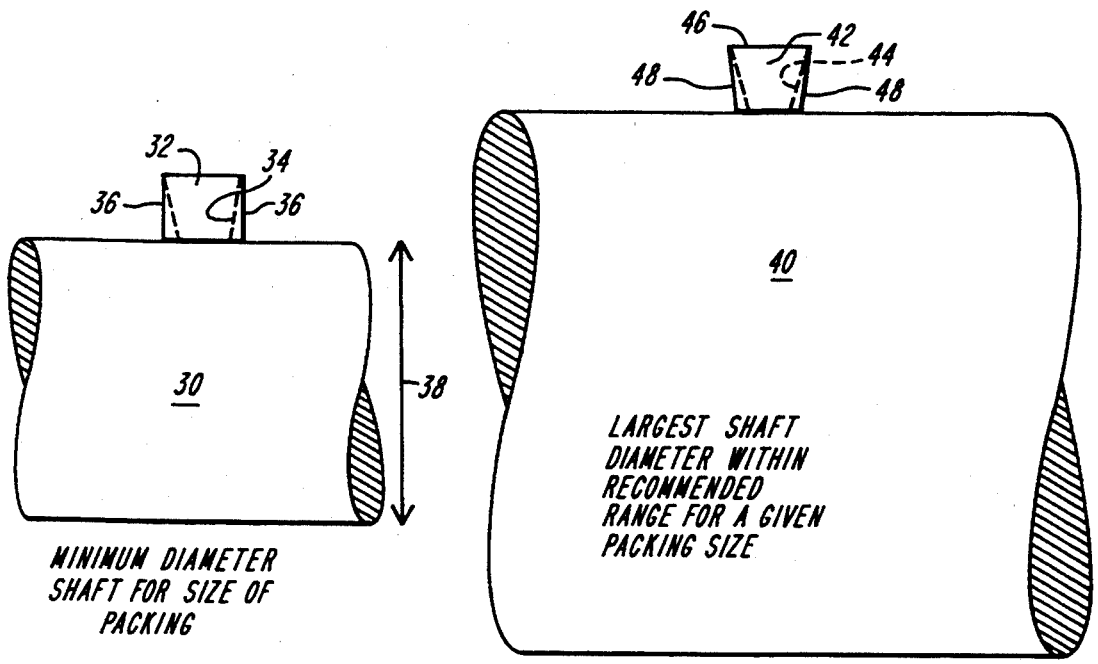
FIG. 2A  FIG. 2B
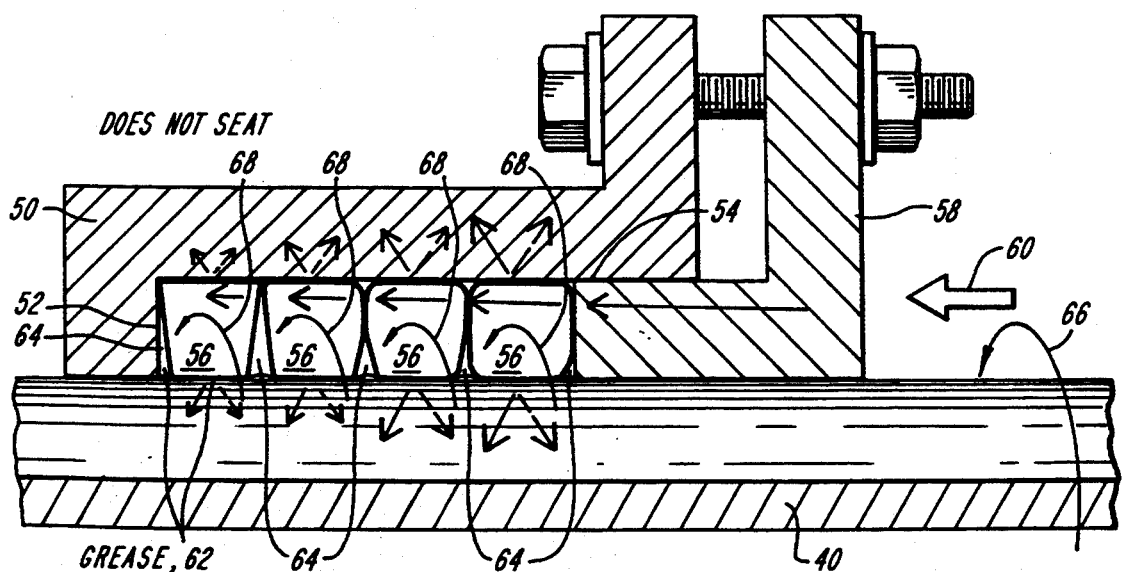
FIG. 3A   ← FORCE FROM GLAND
←-- FRICTIONAL RESISTANCE

ADDITIONAL WARP YARNS IN BASE POSITIONS OR BOTH

ELONGATED ANTISPIN CONTACT AREA, 96

METHOD AND APPARATUS FOR REDUCING PACKING RING SPIN FOR TRAPEZOIDALLY SHAPED MECHANICALLY BRAIDED PACKING

FIELD OF INVENTION

This invention relates to braided mechanical packing and more particularly to a method of braiding that prevents packing ring spin and opening of the joints formed by the ends of the packing rings when the equipment into which they are installed is started up.

BACKGROUND OF THE INVENTION

Braided mechanical packing of a generally square or rectangular cross section has been utilized for many years to seal rotary shafts to the adjacent stuffing box to prevent or minimize the leakage of fluid. The leakage is from the interior of the equipment sealed and runs along the shaft/packing interface to the atmosphere.

As illustrated in U.S. Pat. Nos. 4,550,639; 4,672,879; and 4,729,277 by George B. Champlin, incorporated herein by reference, there is a keystoning problem associated with the use of packing rings having square cross sections when straight. The problem is that the square cross section becomes trapezoidal when the packing is wrapped around the shaft. Note, when wrapped, the wide side of the trapezoid is towards the shaft. The result is scoring of the shaft when the packing is compressed in the stuffing box due to the inside corners of this packing being compacted at the shaft.

This keystone problem is alleviated through the utilization of a packing ring having a trapezoidal shape when straight. When the packing is installed around a shaft with the wider portion of the trapezoidal cross section away from the rotating shaft, the packing changes from its trapezoidal cross section to a square cross section, which shape it maintains when it is compressed in the stuffing box. Because the square cross section has been formed naturally during the wrapping process prior to compression within the stuffing box, and not by means of outside pressures forcing it into the square shape, the scoring and uneven wear of the shaft associated with conventionally braided packing is eliminated. Note, the trapezoidal shape of the packing is provided by braiding the packing on two, three, or four track braiders in which more axial warp fill is added to what will become the outer corners of the braided packing than is used in what will become the inner corners of the packing. The result is a generally trapezoidally-shaped packing which can be achieved without calendaring or passing the packing through a die.

In order to achieve the squaring of the two convergent sides of the trapezoidally-shaped packing when wrapped around the shaft, after several years of experiments, braiding formulas were adjusted such that squaring of the sides would occur about the smallest shaft size commonly used with a given size of packing. For example, with ⅜ inch size packing, the optimal shaft about which this packing can be wrapped is about 3-½ inches in diameter. When such a trapezoidally shaped packing is wrapped about this optimal diameter shaft, the sides of the packing square up from the trapezoidal shaped cross section to a square cross section.

However, when the equipment to be sealed has larger diameter shafts, and such equipment exists with shaft diameters up to 39 inches as an example, the ⅜ inch packing is not bent to as small a radius as the optimal shaft since the shaft about which it is wound has a larger diameter. This means that the converging sides of the packing do not exactly square up. Rather, the wrapped packing retains a somewhat trapezoidal cross section, with the sides of any given ring converging towards the shaft at a slight angle. If the packing is not installed properly, the result is packing rings that shift out of their installed position spin during break-in, which results in uncontrollable leakage.

In summary, while providing trapezoidally-shaped packing is a practical solution to the keystone problem because it works to prevent uneven shaft wear for improperly installed packing, there is nonetheless a problem of packing ring spin during break-in. Break-in is a procedure which refers to the process of tightening the packing gland when the machine into which the packing is installed is first turned on. If improperly installed, these packing rings can spin and the joints formed at the ends of a packing ring can open up. The result of packing ring spin and joint opening is uncontrollable leakage.

Were this packing always installed in the stuffing box in the manner specified by the manufacturer, namely one packing ring at a time, with the first ring being pushed against the bottom of the stuffing box, and the second and subsequent rings being pushed into contact with the previous ring and/or a lantern ring, then regardless of shaft size the rings would not spin, but rather would stay in the position they were placed when installed.

However, in practice, despite instruction both written and verbal to the mechanics who install the packing, there is a significant percentage who insist upon retaining their lifelong habit of installing the packing as they were originally taught, which is to push the first ring into the stuffing box using the second ring, and to push the first and second rings deeper into the stuffing box with the third ring, and so forth until the stuffing box has the requisite number of packing rings. Because of resistance from the friction of the rings already in the stuffing box, when an outer ring pushes against the adjacent inner ring, the rings, instead of being pushed into the stuffing box all the way get thicker in the radial direction, which causes the inner and outer surfaces to bind against the shaft and the stuffing box bore. The result is that the ring nearest the bottom of the stuffing box never seats. Analysis of rings installed as a group show that while the rings closest to the gland are square, those towards the bottom of the stuffing box retain some trapezoidal shape. This indicates that the drawing force of the gland axially down the shaft is dissipated in which the force becomes radial as opposed to longitudinal. Thus the force down the shaft which would push the rings to the bottom of the stuffing box is diverted outwardly. This being the case, the bottom ring never gets pushed to the bottom of the stuffing box with enough force to seat it. During startup, also known as break-in, if the rings are not seated, the rings will spin and joints will open up.

The joints open up because when the ring starts to spin, the end of the ring against which the rotational force pushes, is pushed in the direction of rotation, which opens up a gap between the butted ring ends.

Thus, when improperly installed, the outer portion of the first ring does not actually touch the bottom of the stuffing box, and if it does, there is insufficient pressure on the sides of the inner rings to retain them in their installed position when the equipment is started. Consequently, there is also insufficient frictional contact between the rings and also insufficient pressure on the inner rings to keep them from spinning.

There is also another problem with traditional packing installation, and that is the almost universal use of grease. To help ease the rings into the stuffing box, mechanics routinely apply a coating of grease or other lubricant to all surfaces of the packing rings, a practice passed down through time when one of the principle ingredients of packing was grease or tallow. These types of packing and the practice of adding the coating of grease or tallow were originally used with equipment having reciprocating rods rather than rotating shafts.

The application of grease or other lubricants was and is still used to reduce the friction when pushing the rings down the bore of the stuffing box in the traditional method. However, the use of grease adds to the problem of packing ring spin by reducing the friction between the bore of the stuffing box and the packing rings and between the rings themselves. Note, that it is this necessary friction that holds the packing rings stationary at startup.

Thus, when the mechanic installs trapezoidally shaped packing in the traditional manner, he greatly reduces the service life of the packing he is installing by inadvertently helping to create the mode by which the packing rings are more likely to spin or have their joints at the ends of the rings separate at startup.

Further, much packing is installed by mechanics who do not receive the manufacturers installation instructions due to the practice of issuing a length of packing cut from a bulk roll. Thus the failure to communicate with all who use the modern packing makes it impossible to insure that the packing is properly installed according to modern practice.

As mentioned before, the effect of the rings spinning is twofold. First, there is a leak path formed between the packing and the stuffing box bore and/or the opened joint between the ends of the ring, which creates excessive leakage of fluid from the stuffing box. Second, the spinning ring creates undesired wear at the bore of the stuffing box causing the need for its unnecessary and premature replacement, since wear is planned to be only at the packing/shaft-sleeve interface.

Moreover, the joints formed by the abutting ends of a ring may also open due to the spinning, with the length of the rings shortening to create a gap between the ends of the ring. The open joint thus becomes the source of uncontrollable leakage regardless of how much gland pressure is applied, since a discontinuity or unfillable void has been created in the packing set. This excessive, uncontrollable leakage also causes the need to repack the equipment prematurely.

As a result of these practices, much of the packing used does not provide the maximum length of service time it is capable of providing, raising the costs of packing, installation labor, and equipment downtime. Because of these practical problems there is a need to prevent the spinning or shifting of the packing rings in the stuffing box during the break-in procedure.

SUMMARY OF THE INVENTION

Despite the fact that trapezoidally shaped packing works over a wide variety of shaft sizes when properly installed, in order to accommodate the larger shaft sizes for a given size of packing, the packing rings are braided with extra warp yarns at the sides. When carrier yarns are braided about these extra warps there is a bulge in the sides of the packing perpendicular to the shaft, preferably at the upper half of the packing.

When wrapped around a shaft this bulge is compressed and goes flat to provide both an extended side contact area for increased friction and an outer portion which is more solid. This solid portion also is responsible for better frictional contact between the top of the packing and the stuffing box bore. Ideally, the packing rings are configured such that when viewed crosssectionally, the outer portion of the packing appears much like a rectangle. This rectangle then appears to be mounted on top of the trapezoidal cross section of the packing.

By integrating the added rectangular portion with the trapezoidal portion of the packing, a more solid upper portion is created to provide an elongated area of contact between the adjacent packing rings and between the innermost ring and the bottom of the stuffing box. The solid outer portion also creates more pressure at the outside of the packing ring to increase friction between the ring and the stuffing box bore.

This upper portion, located generally above the horizontal centerline of the packing, provides firm contact between the rings, eliminating spin and joint opening during startup despite the presence of grease applied by mechanics and despite the larger shaft sizes. This technique is also successful regardless of whether the rings are individually installed into the stuffing box according to the modern teachings, or are installed according to the traditional practice using one ring to push the next into the stuffing box.

Thus, no matter which installation method, the subject configuration, while still maintaining a generally trapezoidal shape at the inner portion of the packing, results in increased frictional contact between the stuffing box and the packing rings after they are installed into the stuffing box.

In one embodiment, the outer rectangular portion above the lower trapezoidal portion is created by addition of axial warp yarns in the area adjacent the short sides of the rectangular portion of the packing, with these yarns being braided into the packing as it is made on an interlocking or so-called "lattice" braider. The use of these additional warp yarns is preferably at or above the horizontal center line of the packing. It will be appreciated that these additional axial warp yarns produce a non-uniform density in the warp gradient when the packing is viewed crossectionally, as opposed to the uniform gradient taught in U.S. Pat. No. 4,672,829.

Note: for trapezoidally-shaped packing, the warp fill at the outer corners of the packing is increased over that used at the inner corners to give the trapezoidal shape. To obtain the integral rectangular portion braided together with the trapezoidal portion, in one embodiment which generates 1 inch size packing, warp yarns are added to the "D" positions of a four track Rockwell 36 carrier interlocking braiding machine. A description of the workings of such a machine can be found in U. S. Pat. Nos. 4,802,398, and 3,646,846 incorporated herein by reference. The added warp fill positions are above the horizontal center line of the packing such that the short sides of the rectangular section are generally above the horizontal center line of the packing. In this embodiment, the braiding formula is identical to that associated with the traditional trapezoidally-shaped packing, with the addition of the warp yarns in the "D" and "C" warp positions. Optionally, to preserve a more trapezoidally-shaped lower portion, the warp yarns are decreased at the inner "C" positions.

In another embodiment where ⅜ inch size packing is made on the same four track machine as above, additional fill is only used at the "D" positions to obtain the desired rectangular section integrated with the lower trapezoidal portion.

In yet another embodiment ½ inch size packing was made on a three track Rockwell interlocking braiding machine, with warp yarns added at the side central positions, with no other change in the braiding formula required from the traditional formula used to make the traditional trapezoidally-shaped packing.

In summary, adding axial warps at the sides of the packing, preferably at or above the horizontal center line of the packing provides the appropriate bulging at the upper sides of the packing which forms a rectangular cross section in the upper portion of the packing while integrating the desired trapezoidal section in the lower portion of the packing. To accentuate the angle of convergence of the sides of the trapezoidal section, one can remove warp yarns from the interior wrap positions below the center line of the packing.

BRIEF DESCRIPTION OF THE DRAWINGS

These and other features of the Subject Invention will be better understood taken in conjunction with the Detailed Description in conjunction with the Drawings of which:

FIGS. 2A and 2B are diagrammatic representations illustrating the squaring up of trapezoidally-shaped packing when the packing is wrapped around the optimal diameter shaft for the size of the packing, and illustrating only partial squaring up of the trapezoidally-shaped packing when wrapped around larger diameter shafts;

FIG. 3A is a partial cross sectional and diagrammatic illustration of the problem of the spinning of improperly installed trapezoidally-shaped packing due to the residual trapezoidal shape resulting when the packing is wrapped around larger diameter shafts, and due to the utilization of grease as a lubricant when installing the packing rings;

DETAILED DESCRIPTION

Figure 1:
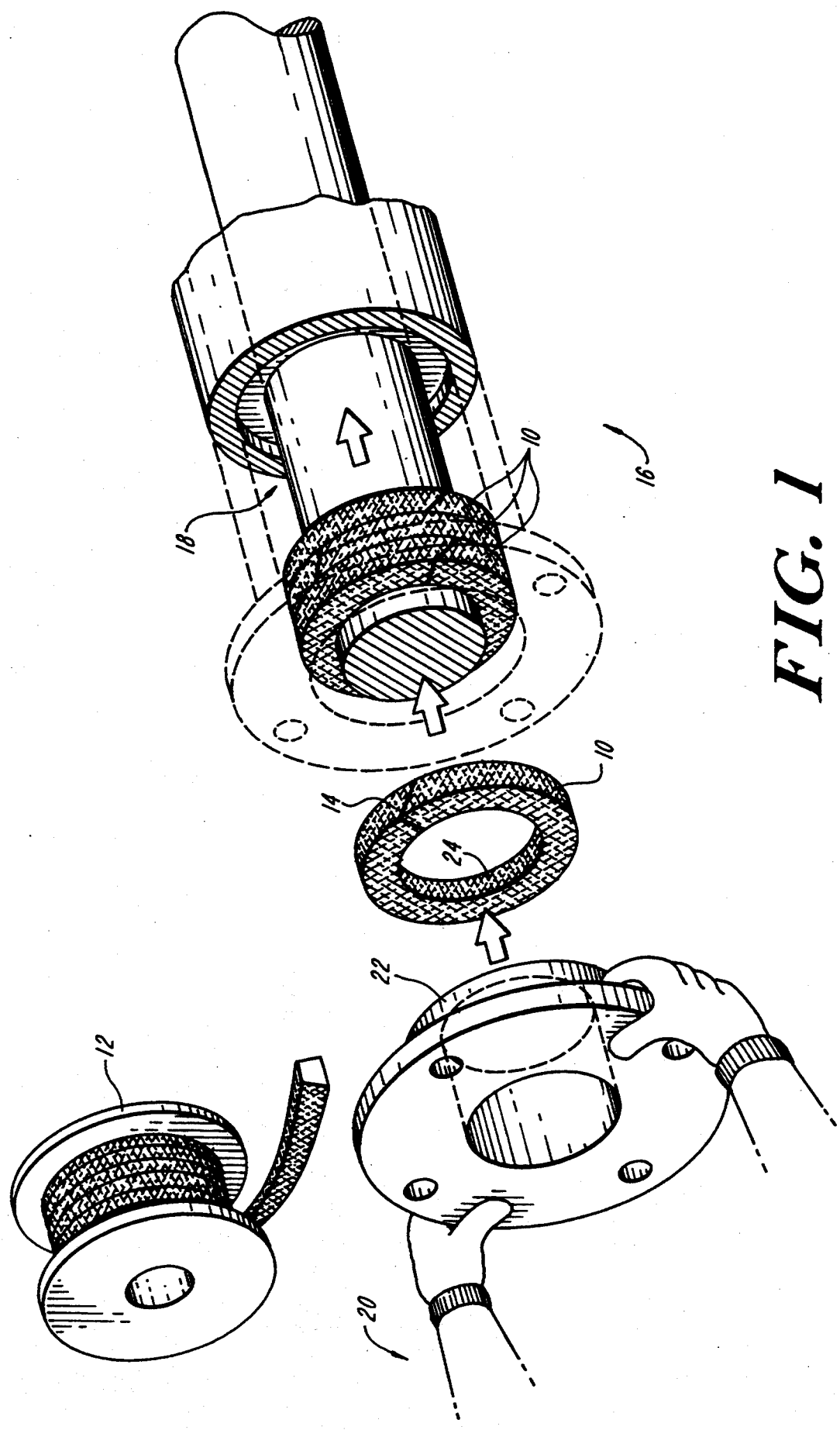
FIG. 1 is a diagrammatic representation of the installation of precut trapezoidally-shaped packing rings into the stuffing box of a pump, illustrating an improper technique for the installing of the braided packing.

Referring now to FIG. 1, individual rings 10 of trapezoidally-shaped packing material are illustrated as being cut from a spool 12, with the ends joined together into rings having 45° skive joints 14, and installed into a pump 16. As can be seen, pump 16 is provided with a stuffing box 18 into which packing rings 10 are to be mounted. Here an individual 20 utilizes the nose 22 of the gland to push each packing ring in on top of another, utilizing grease 24 for lubrication. Note the nose is normally only about one and one half times the width of a ring in length.

Rather than following the prescribed procedure for mounting rings in a stuffing box involving pushing the rings to the bottom of the stuffing box one at a time, as can be seen from this figure, either through habit or ignorance, mechanics almost universally utilize the nose of the gland to push the rings in just one ring width at a time. The mechanic mounts a first ring and pushes it in along the shaft about the width of one ring. Then he mounts another ring and again pushes it in one ring width. This follows along until the last ring is pushed in. The result is that the ring at the bottom never gets totally pushed to the bottom of the stuffing box, nor can uniform pressure be brought to bear on all rings. The result is packing ring spin made worse by the use of grease.

Were proper procedure utilized in which each ring is moved to the bottom of the stuffing box prior to mounting the next ring, when slightly trapezoidal or not, there would be no packing ring spin.

Referring to FIG. 2A, the above unapproved procedure is not particularly deleterious for packings wrapped around a shaft of optimum diameter. For instance, a shaft 30 is provided with a packing 32 which is initially trapezoidally-shaped as illustrated at 34 prior to its being wrapped around the shaft. When this packing is wrapped around the optimal diameter shaft its sides 36 become parallel one to the other in a process called squaring up. For a given size packing, in one instance ⅜ inch, and for a given size shaft, in one embodiment 3-½ inches as illustrated by arrow 38, then the squaring up is ideal due to the match of original braiding size with the optimal shaft diameter. This optimal shaft diameter is actually the minimum diameter which works effectively.

While ⅜ inch packing may be utilized with a wide range of shaft diameters and still result in substantial squaring up of the sides, when the same ⅜ inch packing is used for shafts as large as 39 inches in diameter, the result as seen in FIG. 2B is that for a large diameter shaft 40, packing 42, while initially being trapezoidally-shaped as illustrated at 44 assumes the shape illustrated at 46 in which the sides 48 of the packing are not precisely squared up but rather converge downwardly towards the shaft.

Referring now to FIG. 3A, a large diameter shaft 40 is shown as having been provided with a stuffing box 50 having a bottom 52 and an interior wall 54. Packing rings 56 are shown installed within the stuffing box about a shaft after first having been cut from a spool. Gland 58 is utilized to compress packing rings 56 in the direction of arrow 60 towards the bottom 52 of the stuffing box 50. In this case the rings are prelubricated by a lubricant or grease 62 and are moved to the bottom of the stuffing box, as is traditional, by locating them one on top of another and then pushing them as a group toward the bottom of the stuffing box. As can be seen, there are voids 64 between adjacent packing rings and between the packing ring adjacent the bottom of the stuffing box and the bottom 52 of this stuffing box. When these rings are compressed, voids 64 nonetheless exist reducing frictional contact area. During a break-in procedure in which the shaft 40 rotates as illustrated by arrow 66, one or more of the individual rings rotate as illustrated by arrows 68. This causes wear on the interior wall 5A of the stuffing box 50 and further opens up the ring joints, both of which cause uncontrolled leakage. Due to vibration and non-uniform pressure on the rings, the packing rings shorten as described above and their joints open up resulting in leakage at an unacceptable rate.

The reason for the voids is the inability to apply uniform pressure on all of the rings by just tightening the gland. As can be seen in this figure, while the rings closest to the gland will compress to square, those further in the stuffing box are not provided with enough pressure to square them. Rather, the longitudinal forces along the shaft are diverted radially such that longitudinal pressure at the innermost rings is virtually non-existant.

Thus, for the larger diameter shafts the break-in procedure involving the moving of the gland 58 so as to compress the packing in the stuffing box often results in uncontrollable leakage due to the spinning of the individual rings within the stuffing box, and due to resulting joint opening. The reason for packing spin is because of the grease utilized, because the areas in frictional contact are reduced due to the residual trapezoidal shape and because it is impossible to impart uniform pressure to square up the inner rings.

Figure 3B:
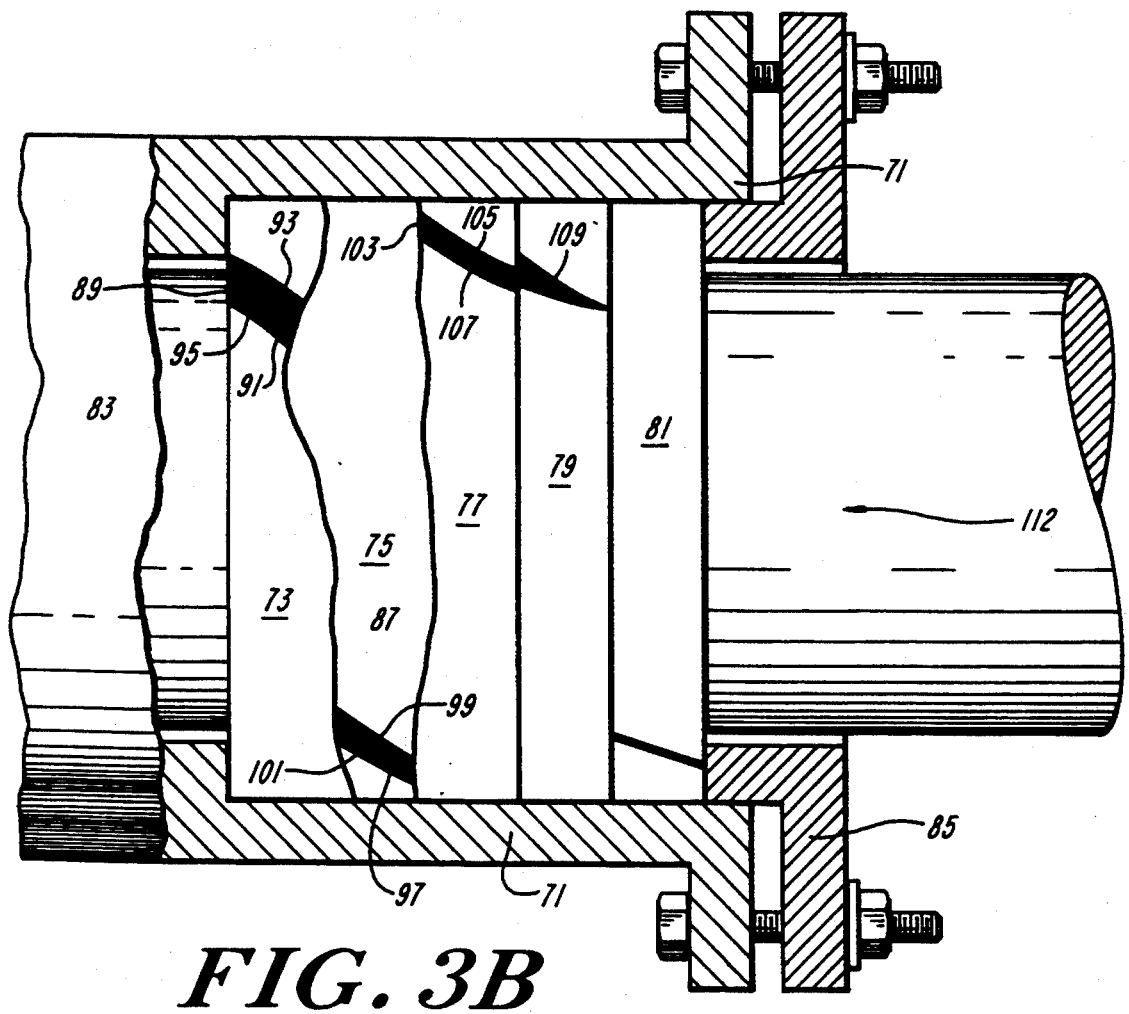
FIG. 3B is a partial cross sectional and diagramatic illustration of the effect, in a stuffing box, of packing rings that have spun during startups.

Referring now to FIG. 3B, the problem engendered by the spinning of rings within a stuffing box is graphically illustrated. Here a stuffing box 71 has been packed with rings 73, 75, 77, 79 and 81. These rings have been compressed towards the end 83 of stuffing box 71 by gland 85. During break-in, ring 73, the ring abutting the bottom of the stuffing box, shortens and deforms as illustrated by its bulge 87 to take on the configuration illustrated. Because of its shortening the joint 89 between its ends 91 and 93 opens up as illustrated by gap 95.

The next adjacent ring, ring 75, in its attempt to fill the discontinuity or gap 95 also causes a joint opening 97 between its ends 99 and 101.

The next adjacent ring 77, due to spinning, has a joint 103 opened up between its ends 105 and 107, with ring 79 having a joint opening 109 which can become aligned with other joint openings to provide a leakage path.

The distorting of the rings due to the nonuniform pressure due to the way the rings are mounted, produces distortions of the rings which cause both uncontrollable leakage and scoring of the interior bore of the stuffing box as well as scoring of the shaft, here illustrated at 112.

Figure 4:
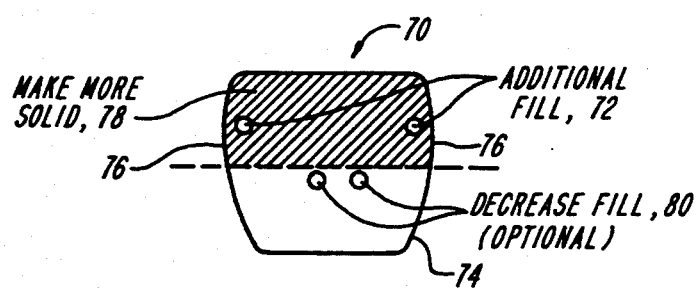
FIG. 4 is a cross sectional and diagrammatic view of a trapezoidally-shaped packing provided with additional warp fill at the sides of the packing, preferably above the horizontal center line of the packing, and an optional decrease in interior fill below this center line.

The spinning problem during break-in is solved in the Subject Invention as illustrated in FIG. 4 in which a packing 70 is provided with additional warp fill or density at the positions illustrated at 72 which provides for a bulging of the sides 74 of the packing at the points 76 adjacent the added fill. This bulging produces a more solid rectangular area 78 at the upper portion of the packing that provides increased frictional contact both between the rings and between the rings and stuffing box surfaces. As illustrated at 80 in a given packing, one can decrease the fill in interior sections of the packing below horizontal center line 82 so as to preserve the lower trapezoidal shape for the unwrapped packing.

Figure 5A:
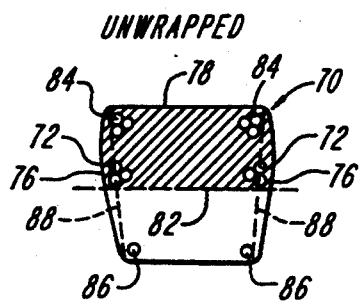
FIGS. 5A, 5B and 5C are diagrammatic representations of the unwrapped, wrapped and compressed antispin configuration for the trapezoidally-shaped packing.
Figure 5B:
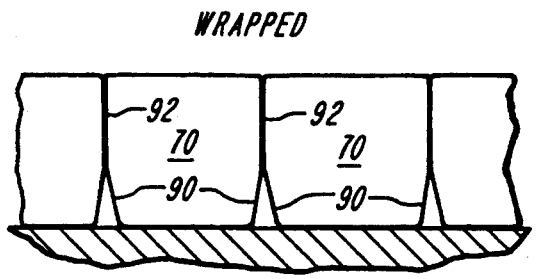
Figure 5C:
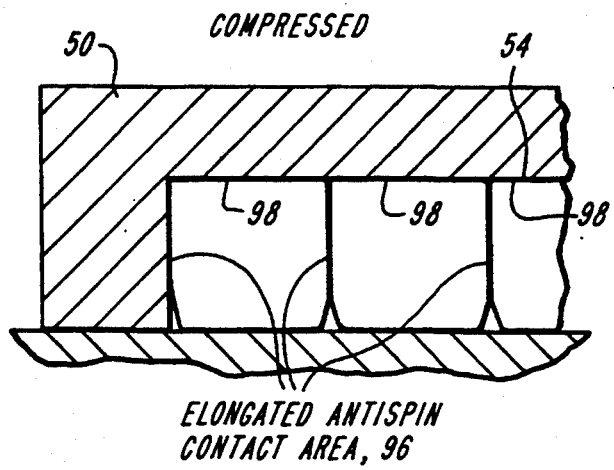

The operation of the packing is more clearly shown in FIGS. 5A, 5B and 5C in which in FIG. 5A packing 70 is provided with the additional fill 72 at the sides of the packing above center line 82. It will be noted that outer corners 84 each have three warp yarns apiece, whereas inner corners 86 have only one warp yarn apiece. This configuration provides the initial trapezoidal shape as illustrated by dotted line 88.

It will be noted that in one embodiment the number of warp yarns added at the sides of the packing are identical to the numbers utilized at the outer corners of the packing, although this is not a critical relationship.

As can be seen in FIG. 5A, the result is the provision of a quasi-rectangular area 78 produced through the bulging sides at points 76, with FIG. 5A showing the cross section of the packing as the packing comes out of the braiding machine. When wrapped as illustrated in FIG. 5B, while the lower half of the packing is indeed trapezoidal as illustrated at 90, the sides of the upper portion 92 of the packing become relatively flatter.

When the wrapped rings are compressed as illustrated in FIG. 5C, elongated anti-spin contact areas 96 are provided at the sides of the packing, whereas the outer surfaces 98 provide increased contact pressure between the top of the packing and the interior side wall 54 of stuffing box 50 since this top surface is supported from below by the more solid quasi-rectangular section.

The result of the elongated contact at the sides of the packing and the more solid upper or top surfaces of the packing is the maintenance of the packing in position during compression and break-in as the shaft rotates. What can be seen is that the voids between the rings are dramatically reduced, with the voids only occurring adjacent the shaft where they cause no harm.

Thus even if the packing is installed on a larger shaft than it is designed for, and even if the packing is installed with grease, and even if the packing rings are installed as a group as opposed to individually pushed to the bottom of the stuffing box, the anti-spin configuration compensates and therefore solves a major problem associated with operator error.

Figure 6:
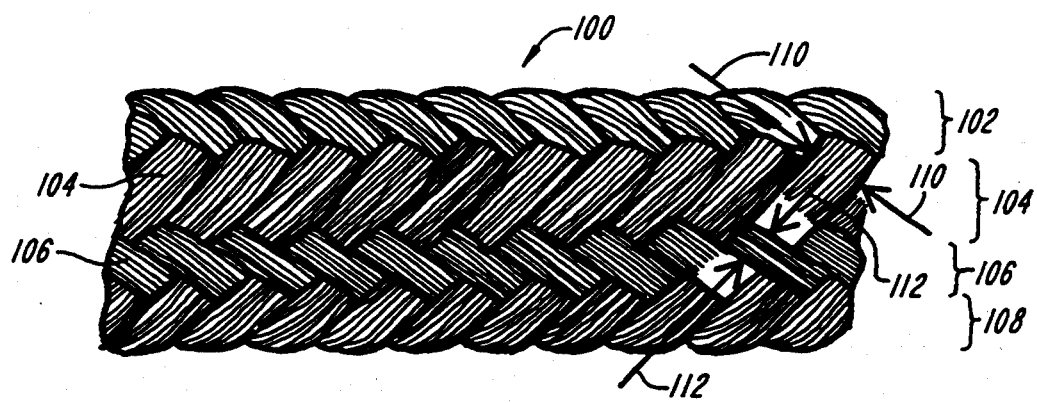
FIG. 6 is a side view of a portion of the mechanical packing made in accordance with the teachings of FIG. 4, illustrating the bulge produced by added warp yarns.

Referring to FIG. 6 a portion of a braid 100 manufactured on a four track braider is shown in which there are four carrier yarns 102, 104, 106 and 108. This side view illustrates that the carrier yarns 104 appear to have a greater thickness as illustrated by arrows 110 than do yarns 106 illustrated by arrows 112. In fact, the carrier yarns 104 and 106 are the same size or number of ends. The broadening thickness of carrier yarns 104 is due to the positioning of the additional warp material under these yarns which causes the bulge and thus the flattening and spreading out of these yarns around the bulge.

Figure 7:
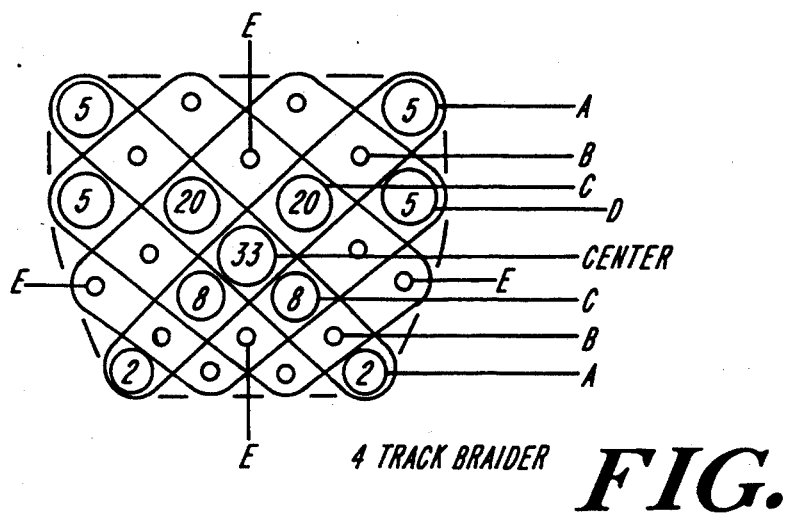
FIG. 7 is a braiding formula for a four track braider illustrating additional warp yarns at the D positions above the center line and a decrease in warp yarns at the interior C positions below the center line.

Referring to FIG. 7, a four track braiding formula for one inch packing is illustrated, with the numbers of warp yarns being indicated at the various positions. Here, while previously there were no warp yarns in the D positions above the center, in order to produce the bulge five yarns per position are used, with these yarns matching the number of yarns in the outer corners. Originally there were twelve yarns apiece in each of the C positions below the center. However, in order to preserve the lower trapezoidal shape this number has been reduced from twelve to eight so as to preserve the lower trapezoidal shape.

Figure 8A:
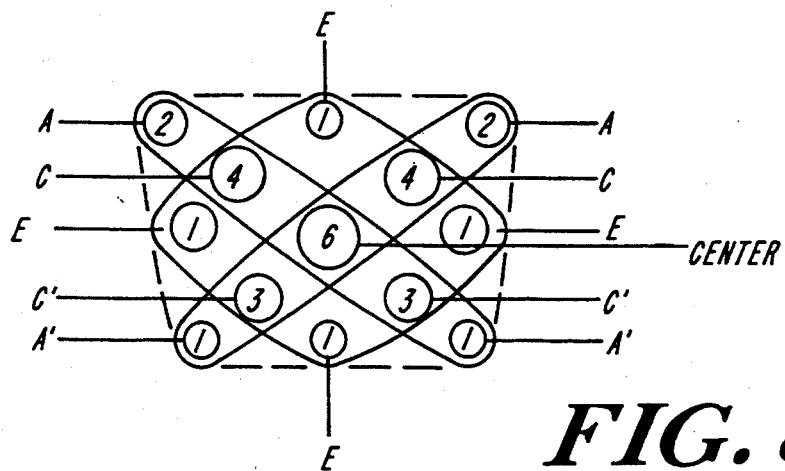
FIG. 8A is a braiding formula for a three track braider illustrating fill at the outer sides of the packing, with decreased center fill at the center position.

With respect to three track braiders and referring now to FIG. 8A, additional fill is added at the sides of the packing along the center line.

Figure 8B:
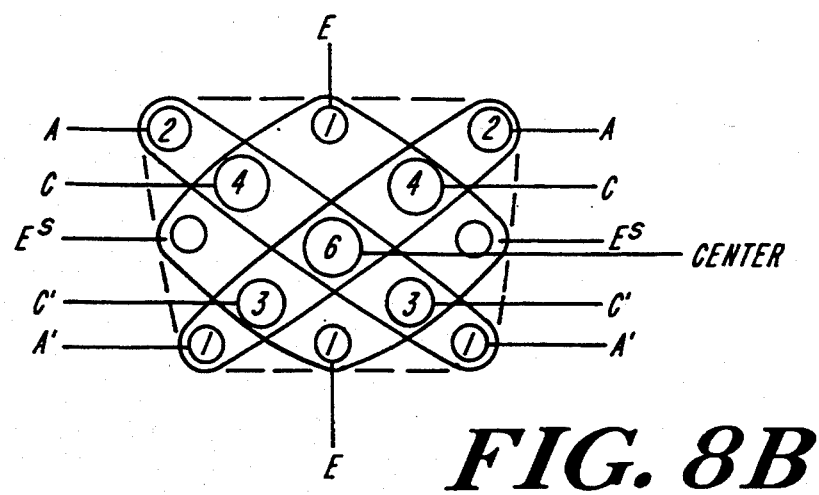
FIG. 8B is a braiding formula for normal trapezoidally shaped packing to point out the differences in between it and the FIG. 8A formula.

Referring to FIG. 8B, the braiding formula for normal trapezoidally-shaped braid is presented for comparison with the FIG. 8A formula.

Here the center track carriers have 1 yarn of Y10262 GFO fiber from W. L. Gore & Assoc. The corner tracks carriers have 1 yarn of Type 137 Kevlar TEXIT fiber from E. I. Dupont. Axial fill is Y10262 GFO fiber, with the number of warps by position as follows: A=2, E=1, C=4, Center=6, $E^s$=0, A=1, E=1, and C=3. The FIG. 8A embodiment merely adds one warp at of each $E^s$ position.

While the braiding formulae vary from packing to packing and size to size, the bulge is formed by providing additional warp yarns at the sides of the packing. While not necessarily so, the bulge is preferably provided above the horizontal center line. Optionally interior warp yarns may be removed at selected locations to preserve the lower unwrapped trapezoidal shape.

In summary, in order to achieve a squaring up of the sides of the trapezoidally-shaped packing when wrapped around the shaft, for a given size of packing, there is an optimal shaft size about which this can be wrapped. When such a packing is wrapped around this optimal diameter shaft, the sides of the packing square up from the trapezoidal shape to a square shape. However, when larger diameter shafts are utilized, packing is not bent as much since it is wound around the larger diameter shaft. This means that the sides of the packing do not exactly square up. Rather the wrapped packing resembles a trapezoid in cross section, with the sides converging downwardly towards the shaft at a slight angle.

Were this packing installed in the stuffing box in the manner specified by the manufacturer, namely one packing ring at a time, no ring spin or joint opening would occur. Despite instructions to the mechanics who install the packing, mechanics universally push all of the packing rings into the stuffing box as a group, and additionally usually utilize grease which is totally unnecessary and detrimental to full service life of present day packings.

This being the case, the misinstallation of the trapezoidally-shaped packing about larger shaft sizes oftentimes results in spinning of the rings of packing at the time that the packing gland is moved to compress the packing during a break-in procedure. The grease adds to the problem of spinning because the sides of the packing can neither frictionally contact each other, nor frictionally contact the interior surfaces of the stuffing box. The result of spinning packing rings is opening up of voids between the packing rings which results in leakage at an unacceptable rate. Unbalanced forces on the rings also cause the joints to open. Were the trapezoidally-shaped packing rings installed properly, i.e., one at a time, with each ring moved to the bottom of the stuffing box before the next ring is installed, then the slight difference in the squaring up of the packing between the optimal diameter shaft and the largest diameter shaft would not result in packing ring spin or joint loosening. Thus, with correct installation, the amount of residual trapezoidal shape would not adversely affect the break-in process.

However, given the actual conditions under which stuffing boxes are packed, there is a need to prevent the spinning of packing rings in the stuffing box during the break-in procedure.

In order to accommodate the larger shaft sizes for a given size of packing, the packing rings are configured with bulging sides, such that when the packing is wrapped about a shaft, the sides of the packing adjacent one another become flat and when compressed provide an elongated area of contact between the adjacent packing rings and between the end ring and the bottom of the stuffing box with more frictional force being applied by the outside of the rings to the interior wall of the stuffing box. The bulging side configuration gives the outer portion of the packing a rectangular cross section positioned atop a lower trapezoidal portion. This configuration eliminates packing ring spin for a wide variety of shaft sizes for a given size packing, regardless of the presence of grease. This technique is also successful regardless of whether the packing rings are individually installed and pushed into the stuffing box or whether they are installed with one ring pushing against the next to drive the rings towards the bottom of the stuffing box. Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. A system for reducing packing ring spin and opening up of packing ring joints during break-in of braided packing having a substantially trapezoidal shaped cross section, comprising:

a substantially trapezoidally shaped mechanically braided packing having opposed non-parallel longitudinally extending sides extending between outer and inner parallel sides of said packing and warp yarns running longitudinally therethrough, said packing having additional warp yarns positioned adjacent said opposed non-parallel longitudinally extending sides of said packing such that the opposed longitudinal sides of said packing have a bulge adjacent said additional warps.

2. The system of claim 1 wherein said packing has an inner and outer side, wherein said packing has a transverse horizontal center line parallel to the outer and inner sides of the trapezoid and wherein said additional warp yarns are positioned above said horizontal center line of said packing towards the outer side of said packing to produce said bulge above said horizontal center-line.

3. The system of claim 2 wherein said substantially trapezoidally shaped packing has a trapezoidal portion and wherein said trapezoidal portion is maintained below said horizontal center line, said packing including a central region, with said system including a reduced number of said warp yarns in the portion of said central region below said horizontal center line.

4. A system for reducing the spin of substantially trapezoidally shaped mechanically braided packing during the break-in procedure in which rings of said packing are positioned about a shaft within a stuffing box and wherein the gland of said stuffing box is tightened so as to compress packing rings in the stuffing box as said shaft is rotated, comprising:

a substantially trapezoidally shaped packing having longitudinally extending warps positioned to give said packing a substantially trapezoidal shape, said packing having a solid region above a transverse horizontal center line of said packing, said solid region having said warps therein to provide said solid region with a substantially rectilinear shape, said rectilinear shaped solid region being positioned above a substantially trapezoidally shaped region of said packing.

5. The system of claim 4 wherein said rectilinear solid region includes opposed longitudinal sides each having a bulge.

6. The system of claim 5 wherein said sides having a bulge include said warp yarns therewithin.

* * * * *